US007655061B2

(12) United States Patent
Parkinson

(10) Patent No.: US 7,655,061 B2
(45) Date of Patent: Feb. 2, 2010

(54) CYCLONE ASSEMBLY AND METHOD FOR INCREASING OR DECREASING FLOW CAPACITY OF A CYCLONE SEPARATOR IN USE

(75) Inventor: David John Parkinson, Clevedon (GB)

(73) Assignee: Cameron International Corporation, Houston, TX (US)

( * ) Notice: Subject to any disclaimer, the term of this patent is extended or adjusted under 35 U.S.C. 154(b) by 108 days.

(21) Appl. No.: 10/589,940

(22) PCT Filed: Feb. 25, 2005
(Under 37 CFR 1.47)

(86) PCT No.: PCT/GB2005/000718

§ 371 (c)(1),
(2), (4) Date: Jun. 27, 2007

(87) PCT Pub. No.: WO2005/082541

PCT Pub. Date: Sep. 9, 2005

(65) Prior Publication Data

US 2008/0251468 A1 Oct. 16, 2008

(30) Foreign Application Priority Data

Feb. 27, 2004 (GB) ................................ 0404417.8

(51) Int. Cl.
*B01D 45/00* (2006.01)
*B01D 45/12* (2006.01)

(52) U.S. Cl. ......................... 55/435; 55/345; 210/512.2

(58) Field of Classification Search .............. 210/512.1, 210/512.2, 512.3; 209/715, 717, 719, 711, 209/720–722; 55/337, 429, 447, 456, 457, 55/459.1–459.5, 345, 346, 343, 348, 349, 55/435, 436
See application file for complete search history.

(56) References Cited

U.S. PATENT DOCUMENTS

| | | | | |
|---|---|---|---|---|
| 1,755,780 | A * | 4/1930 | Hawley | 209/727 |
| 3,087,645 | A * | 4/1963 | Eddy et al. | 220/62.17 |
| 3,370,408 | A * | 2/1968 | Lehrer et al. | 55/429 |
| 3,443,696 | A * | 5/1969 | Schutte | 210/297 |
| 3,959,150 | A * | 5/1976 | Frykhult et al. | 210/512.2 |
| 4,090,956 | A * | 5/1978 | Benzon | 209/732 |
| 4,810,264 | A * | 3/1989 | Dewitz | 48/210 |
| 4,956,090 | A * | 9/1990 | Robinson | 210/512.1 |
| 5,597,628 | A * | 1/1997 | Cetrelli et al. | 428/34.6 |
| 5,853,266 | A * | 12/1998 | Parkinson et al. | 406/143 |
| 6,596,170 | B2 * | 7/2003 | Tuszko et al. | 210/512.1 |
| 6,833,016 | B2 * | 12/2004 | Witter | 55/337 |
| 7,185,765 | B2 * | 3/2007 | Hakola | 209/734 |
| 7,357,824 | B2 * | 4/2008 | Hakola | 55/435 |

* cited by examiner

*Primary Examiner*—Tony G Soohoo
*Assistant Examiner*—David C Mellon
(74) *Attorney, Agent, or Firm*—Mossman Kumar & Tyler PC

(57) ABSTRACT

A cyclone separator (40) includes a housing (42), in which a cyclone assembly (10) is contained. The housing (42) has an inflow chamber (44), an overflow chamber (46) and a discharge chamber (48). The cyclone assembly (10) has an inner cyclone liner (16) positioned concentrically within a cyclone chamber (12). A displacement means (52) is provided for displacing the inner cyclone liner (16) axially from an operative position in the cyclone chamber (12) to an inoperative position in the overflow chamber (46) of the housing (42). The cyclone chamber (12) has a larger internal diameter than the inner cyclone liner (16), therefore, when the inner cyclone liner is moved to the inoperative position, the flowrate through the cyclone assembly is increased.

20 Claims, 5 Drawing Sheets

CYCLONE ASSEMBLY AND METHOD FOR INCREASING OR DECREASING FLOW CAPACITY OF A CYCLONE SEPARATOR IN USE

The present invention relates to a cyclone assembly and method for increasing or decreasing the flow capacity of a cyclone separator in use.

BACKGROUND

It has been known for some time that the management of solid particles, for example, sands, asphaltenes, clays, drill cuttings, and scale particles, discharged from hydrocarbon producing wells, has an important impact on downstream processing equipment. Some typical problems associated with downstream processing are:

Wear on valves, particularly choke pressure control valves

Drop out of solids in processing vessels such as three phase separators

Wear on pumps and rotating equipment

The management of separated solids on the seabed following sub-sea processing

Disposal of solids, which are contaminated with oil offshore.

With the advent of directional drilling, which is used to seek out and produce ever more recoverable hydrocarbons from old or marginal reservoirs, and the use of lateral completions, ever increasing volumes of solids are being produced.

The use of a well head de-sander in the form of a solid/liquid cyclone housed in a pressure vessel is well known and has been utilised successfully in the offshore oil and gas exploration and production industry. A well head de-sander is typically designed to cope with slowly increasing flow rate, in order to match the field production profile of a reservoir's life. Therefore, the design must have a sufficient turndown (ie, minimum to maximum flow capacity whilst remaining an efficient separator).

Up to now, this is often been achieved in one of two ways, either by taking the de-sander off-line and changing the number of cyclone liners before returning it on-line, or by directing the flow to one or more cyclone vessels as required.

In the first method, a cyclone vessel may have the ability to hold, for example, forty cyclone liners, but has only twenty liners installed with twenty blank liners. When the flow rate through the cyclone vessel increases to the point where the pressure drop across the cyclone vessel is too high, the operator takes the cyclone vessel off line, opens it and installs more cyclone liners.

In the second method, the same effect can be achieved by having two cyclone vessels, for example, each with twenty liners installed on a skid system with valves installed on the skid manifold to allow selection of the vessels and hence number of cyclone liners on line at a given time.

In a typical example system, a well produces a volume of liquids with some associated gas, for example, 50 $m^3$/hr. The pressure available for use by the cyclone de-sander is typically 1 bar. Cyclone liner design characteristics determine that the efficient maximum flow rate per liner whilst meeting its $d_{90}$ cut size is given by the available pressure drop allowed divided by a constant depending on the cyclone shape size and efficiency. In this example a cyclone liner is chosen that has a maximum flow rate under these conditions of 10 $m^3$/hr whilst separating 90% of all particles 20 microns and above that have a density equal to or greater than 2000 kg/$m^3$. The field's initial flow rate is considered to be 30 $m^3$/hr and after one years operation is likely to increase to 50 $m^3$/hr.

The cyclone vessel is therefore initially filled with three cyclone liners and two blanks. Once the pressure drop through the cyclone vessel increases to above 1 bar, the vessel is taken offline, the two blanks are removed and two extra cyclone liners are installed. The cyclone vessel is then brought back on line.

When considering a gas field, the problem of flow and pressure change is exaggerated because the gas production often begins as a low volume dense phase fluid at high pressure, and as the field matures the volume increases and the pressure drops. This therefore requires either a smaller cyclone liner type on start up, which will need to be replaced later in the field's life with a larger cyclone, or a high number of extra smaller cyclone liners in separate vessels or added to a single vessel as needs be.

Whereas these systems have had some success to date onshore and on topsides offshore, these systems are not practicable when considering sub-sea processing, because the retrieval of a cyclone vessel for maintenance and/or the use of divers in deep sea areas are not viable.

It is therefore an object of the invention to provide a new cyclone assembly, which has an improved turndown, ie, minimum to maximum flow capacity whilst remaining an efficient separator.

STATEMENTS OF INVENTION

According to the present invention there is provided a cyclone assembly comprising a cyclone chamber, an inner cyclone liner adapted to be received within the cyclone chamber, and displacement means for displacing the inner cyclone liner relative to the cyclone chamber between an operative position and an inoperative position.

Preferably the cyclone chamber comprises an outer cyclone liner.

Preferably the inner cyclone liner is adapted to be displaced along a longitudinal axis of the outer cyclone liner between the operative position and inoperative position, Preferably a seal is provided at a lower end of the inner cyclone liner, which seals between the inner and outer cyclone liners when the inner cyclone liner is in the operative position.

Preferably the inner cyclone liner has an inlet let into its periphery.

Preferably the outer cyclone liner has an inlet let into its periphery.

Preferably the inner cyclone liner has an overflow outlet for fluids at an upper end and a discharge outlet for solids at its lower end.

Preferably the outer cyclone liner has an overflow outlet for fluids at an upper end and a discharge outlet for solids at a lower end.

Preferably the inner cyclone liner is able to pass through the overflow outlet of the outer cyclone liner.

According to a second aspect of the present invention there is provided a cyclone separator including the cyclone assembly contained within a housing.

Preferably the housing has an inflow chamber, an overflow chamber and a discharge chamber.

Preferably a fluid supply duct is provided in fluid communication with the inflow chamber.

Preferably the cyclone chamber is substantially contained in the inflow chamber.

Preferably the inner cyclone liner can be positioned concentrically within the cyclone chamber in the operative position, or displaced axially to the inoperative position within the overflow chamber.

Preferably actuation of the displacement means is automatic, and is triggered when a predetermined pressure differential is detected between an inflow and outflow of the separator.

Preferably the displacement means is a threaded spindle. A hand wheel may be provided for actuation of the threaded spindle by rotation.

Preferably the displacement means is powered by an actuator, which may, for example, be an electric, hydraulic or pneumatic actuator.

Preferably the displacement means is powered by springs.

Preferably the displacement means is powered by the pressure differential between the inflow and outflow of the separator.

Preferably a fluidising unit is connected to the discharge chamber.

Preferably a heated jacket is provided around the separator.

Alternatively the cyclone separator is adapted to be heated by heat tracing.

The cyclone separator may be incorporated in a choke or a blow-out protector.

Preferably the cyclone separator is incorporated in a wellhead assembly or manifold.

Preferably the cyclone separator is adapted to be operated on the seabed.

Preferably the cyclone separator is adapted to be operated by a remotely controlled vehicle on the seabed.

The cyclone separator may be positioned on the seabed and arranged to remove solids from a fluid flow prior to a process or separation system.

According to a third aspect of the present invention there is provided an apparatus for treating a well head stream comprising a plurality of cyclone separators mounted on a skid, a receiving vessel for solids and a hydro-transportation device for discharging cleaned solids.

Preferably the receiving vessel for solids includes a cleaning cyclone, a re-circulation inductor and de-agglomeration means.

Preferably the de-agglomeration means is either chemical or ultrasonic.

Preferably the hydro-transportation device discharges directly into the sea or when in sub-sea operation, into a riser.

According to a fourth aspect of the present invention there is provided a method of increasing the flow capacity of a cyclone separator during use, comprising the step of withdrawing an inner cyclone liner from an operative position within a cyclone chamber to an inoperative position axially spaced from the cyclone chamber.

When the inner cyclone liner is in the inoperative position, the cyclone chamber operates alone to provide a separating function. As the cyclone chamber has a larger internal diameter than the inner cyclone liner, when the inner cyclone liner is in the inoperative position, the flowrate through the cyclone assembly is increased.

Preferably the cyclone chamber comprises an outer cyclone liner.

According to a fifth aspect of the present invention there is provided a method of reducing the flow capacity of a cyclone separator during use, comprising the step of inserting an inner cyclone liner to an operative position within an outer cyclone liner from an inoperative position axially spaced from the outer cyclone liner, thereby making the inner cyclone liner, which has a smaller internal diameter, the operative liner of the cyclone separator.

Preferably, when the inner cyclone liner is moved to the operative position, the pressure differential between the inlet and fluid outlet of the cyclone separator increases as the fluid flow capacity reduces.

The fluid flow capacity reduction and pressure increase are due to the reduction of cross-sectional area of the operative chamber of the cyclone. If the differential pressure across the inlet and outlet of the separator were to decrease or increase, without a change of liner (ie cross sectional area of the operative chamber) then a corresponding respective decrease or increase in flowrate would be expected. It is an advantage of the invention, that even with a decrease in the differential pressure, an increased flowrate can be achieved, by movement of the inner cyclone liner to the inoperative position.

BRIEF DESCRIPTION OF THE DRAWINGS

The invention will now be described, by way of example, with reference to the accompanying drawings in which.

DETAILED DESCRIPTION OF PREFERRED EMBODIMENTS

Figure 1:
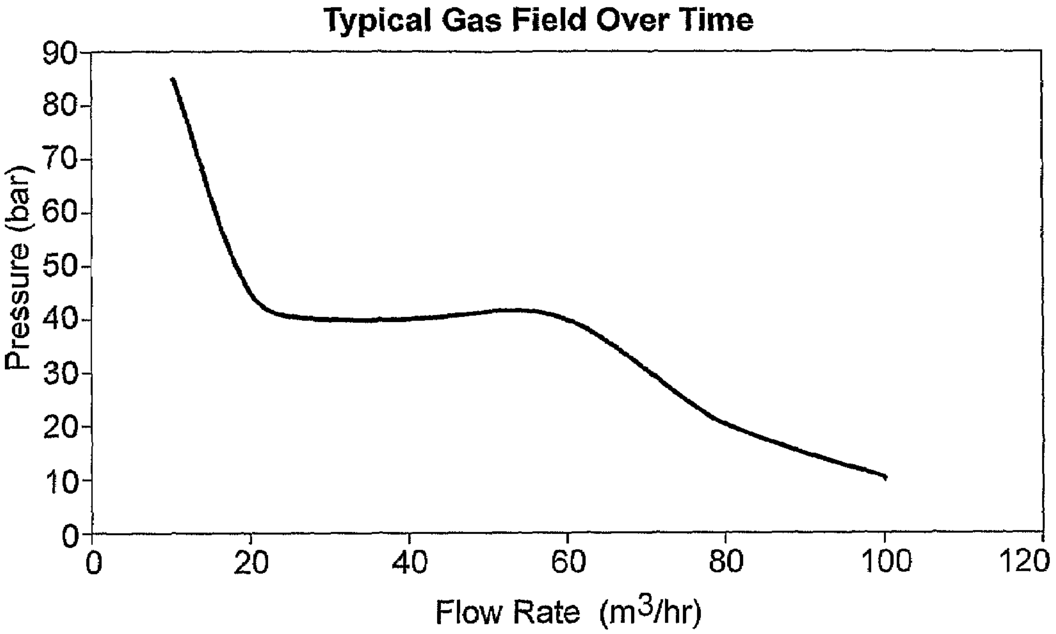
FIG. 1 is a graph showing the relationship between pressure and flow rate for a typical gas field over a typical time period of between one and five years.

Referring firstly to FIG. 1, in a typical gas field, the flow rate to be passed through a cyclone separator, during the course of the life of the gas field, may increase from 10 $m^3$/hr to 100 $m^3$/hr. The pressure drop associated with such an increased flow rate is approximately from 85 bar down to 10 bar. It can therefore be seen that a cyclone separator may be required to operate over a flow rate range of 90 $m^3$/hr, whilst maintaining efficient separation.

Figure 2:
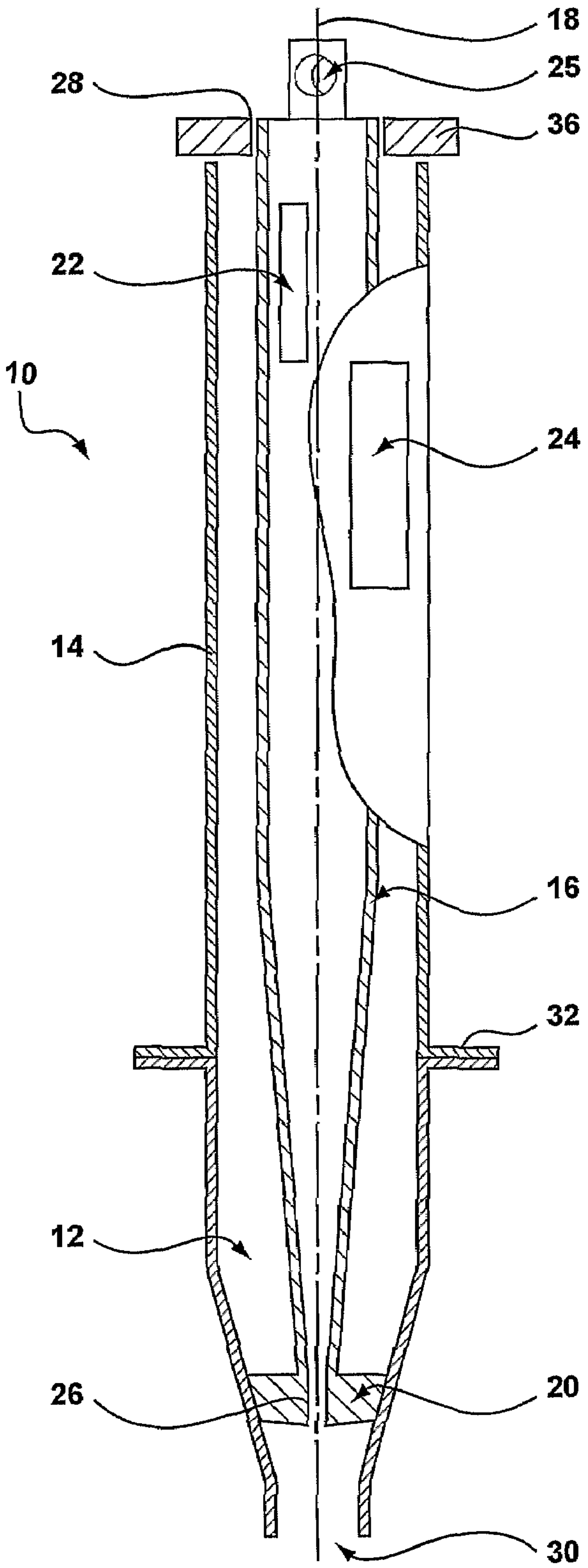
FIG. 2 shows a cross-sectional view through a cyclone assembly in accordance with the invention.

Referring to FIG. 2, a cyclone assembly is indicated generally at 10 and comprises a cyclone chamber 12, formed by an outer cyclone liner 14, and an inner cyclone liner 16. The inner cyclone liner 16 is adapted to be displaced along a longitudinal axis 18 of the outer cyclone liner 14 between an operative position, as viewed in FIGS. 2 and 3, and inoperative position, as viewed in FIG. 4, and explained further below.

A seal collar 20 is provided at a lower end of the inner cyclone liner 16. The seal collar 20 is integral with the inner cyclone liner 16, and seals between the inner and outer cyclone liners when the inner cyclone liner is in the operative position.

An inlet 22 is let into the periphery of the inner cyclone liner 16, and a similar inlet 24 is let into the periphery of the outer cyclone liner 14. Each inlet 22, 24 has the shape of a vertical slot, which when supplied with a tangential fluid flow, causes swirling or a rotational flow pattern inside the respective liner 16,14.

An overflow outlet 25 for fluids is provided at an upper end of the inner cyclone liner 16 and a discharge outlet 26 is provided for solids at its lower end. Similarly, an overflow outlet 28 for fluids is provided at an upper end of the outer cyclone liner 14 and a discharge outlet 30 for solids at a lower end. The maximum diameter of the inner cyclone liner 16 is set so that the inner cyclone liner 16 can pass through the overflow outlet 28 of the outer cyclone liner 14.

Figure 3:
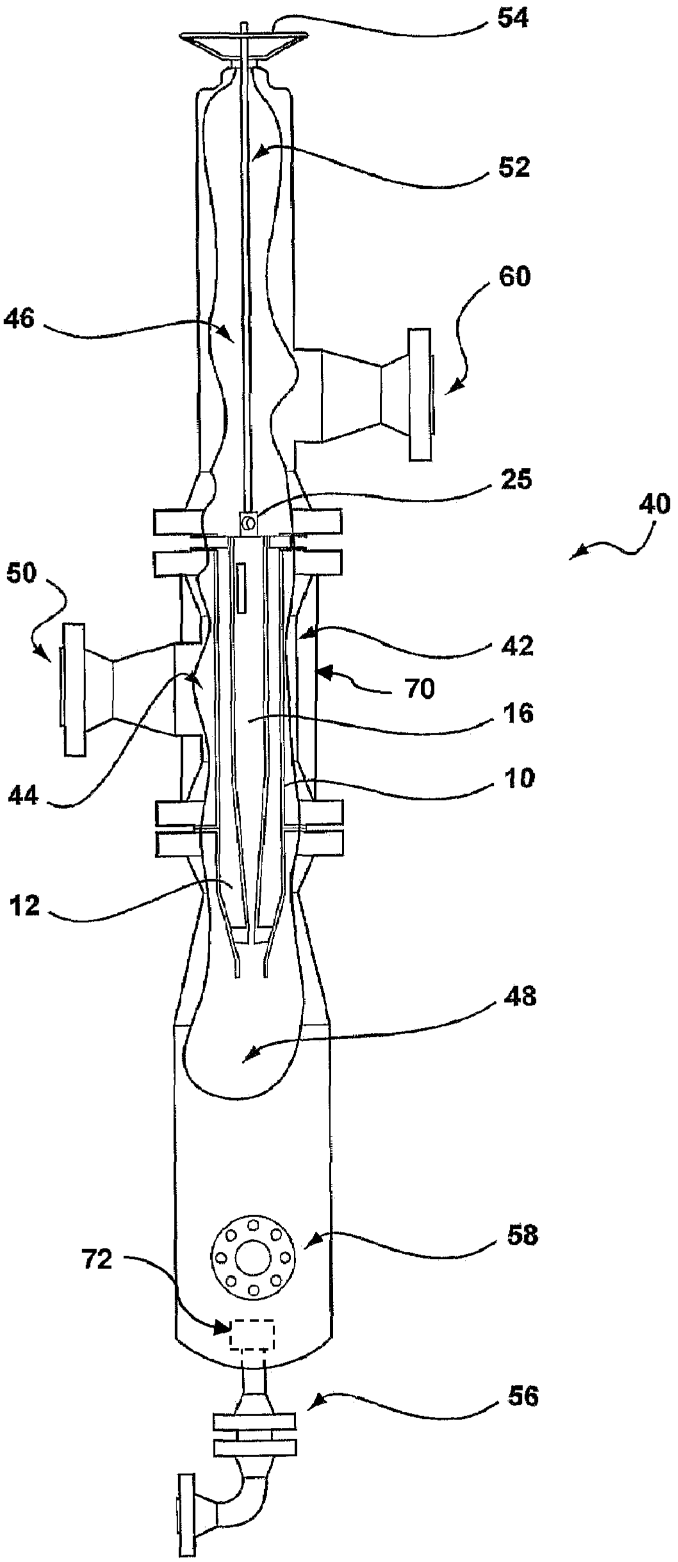
FIG. 3 shows a side view of a cyclone separator, partly in cross-section, including the cyclone assembly of FIG. 2 with an inner cyclone liner in an operative position.
Figure 4:
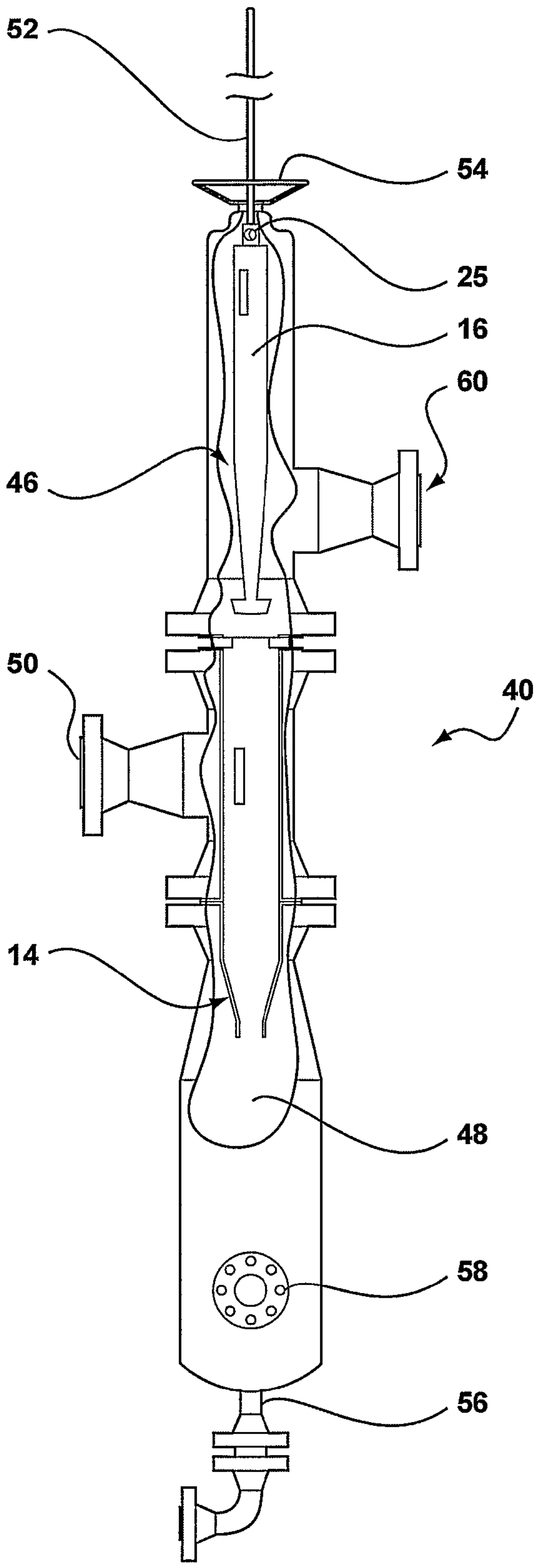
FIG. 4 shows a side view of the cyclone separator of FIG. 3, partly in cross-section, with the inner cyclone liner in an in-operative position.

An outwardly extending circumferential flange 32 is provided part-way along the outer cyclone liner 14, which enables the liner 14 to be mounted in a cyclone separator, indicated generally at 40 in FIGS. 3 and 4. An end cap 36, through which the overflow outlet 28 is provided, is attached to the upper end of the outer cyclone liner 14. The end cap 36 also protrudes as an outwardly extending circumferential flange, and provides further means for mounting the cyclone assembly in the cyclone separator 40.

The cyclone separator 40, see in particular FIG. 3, includes a housing 42, in which the cyclone assembly 10 is contained. The housing 42 has an inflow chamber 44, an overflow chamber 46 and a discharge chamber 48. A fluid supply duct 50 is provided in fluid communication with the inflow chamber 44, where the cyclone assembly 10 is substantially contained. The inner cyclone liner 16 is positioned concentrically within the cyclone chamber 12 of the outer cyclone liner 14 in the operative position, but is contained in the overflow chamber 46 of the housing 42, when displaced axially to the inoperative position as shown in FIG. 4. The housing 42 is capable of withstanding high pressures, typically associated with oil and gas wells.

Figure 5:
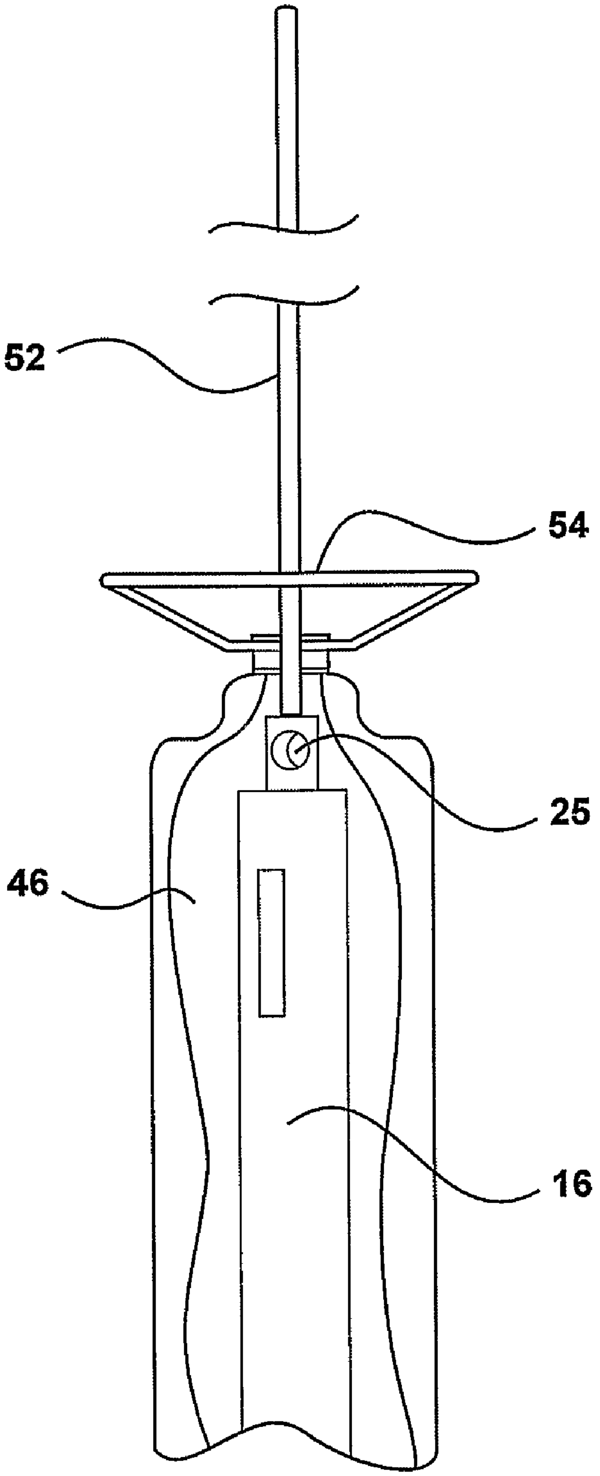
FIG. 5 is an enlarged view of a spindle and hand wheel, also shown in FIGS. 3 and 4, for displacing the inner cyclone liner.

Referring also to FIG. 5, a threaded spindle 52 is connected at its lower end to the overflow outlet 24 of the inner cyclone liner 16, and passes through the upper end of the overflow chamber 46. A hand wheel 54 is provided in threaded engagement with the spindle 52, and on actuation of the hand wheel by rotation, the spindle and inner cyclone liner 16 can be axially displaced along the axis 18. Means is provided for preventing rotation of the spindle; for example, a key and keyway.

A pressure sensor and pressure indication means (not shown) is provided to enable an operator to identify when to move the inner cyclone liner 16 to the inoperative or operative position. The sensor detects the pressure differential between an inflow and outflow of the separator 40.

In a preferred embodiment of the invention, not shown, actuation of the threaded spindle 52 and hand wheel 54 or other displacement means is automatic, and is triggered when a predetermined pressure differential is detected between an inflow and outflow of the separator 40. The displacement means can be powered by any suitable means, but preferably is powered by a hydraulic, pneumatic or electric actuator, by springs or by the pressure differential between the inflow and outflow of the separator.

A fluidizing unit 72 can be connected to the discharge chamber 48 by means of a fluidizing unit feed duct 56 and a solids outlet duct 58. The fluidizing unit 72 creates a localised swirling flow which breaks up agglomeration and entrains particles into an outlet flow of well stream fluids. Separated well stream fluids flow out through an outlet duct 60, which is in fluid connection with the overflow chamber 46.

In order to facilitate flow of fluid, particularly hydrocarbons, through the separator 40, a heated jacket 70 can be provided around the separator. Alternatively the cyclone separator 40 is adapted to be heated by heat tracing.

In use, the cyclone separator 40 can be incorporated in a choke or a blow-out protector, or in a wellhead assembly or manifold. The separator 40 can also be adapted to be operated on the seabed, by means of a remotely controlled vehicle. When positioned on the seabed, the cyclone separator 40 can be arranged to remove solids from a fluid flow prior to a process or separation system.

In a further preferred embodiment of the invention for treating a well head stream (not shown), a plurality of cyclone separators can be mounted on a skid, together with a receiving vessel for solids and a hydro-transportation device for discharging cleaned solids. The receiving vessel for solids preferably includes a cleaning cyclone, a re-circulation inductor and de-agglomeration means. The de-agglomeration means is either chemical or ultrasonic. In use, the hydro-transportation device discharges directly into the sea or when in sub-sea operation, into a riser.

In use, the flow capacity of the cyclone separator 40 can be increased by withdrawing the inner cyclone liner 16 from its operative position within the outer cyclone liner 14, as shown in FIGS. 2 and 3, to the inoperative position axially spaced from the outer cyclone liner 14, thereby making the outer cyclone liner 14, which has a larger internal diameter, the operative finer of the cyclone separator 40.

The result is that the pressure differential between an inlet and an outlet of the cyclone separator reduces even though the flowrate through the separator increases.

Furthermore, the flow capacity of the cyclone separator can be reduced during use, by inserting the inner cyclone liner 16 to an operative position within the outer cyclone liner 14 from the inoperative position axially spaced from the outer cyclone liner, thereby making the inner cyclone liner, which has a smaller internal diameter, the operative liner of the cyclone separator. In this case, the pressure between an inlet and an outlet of the cyclone separator increases as the flow capacity reduces.

When the inner cyclone liner 16 is in the operative position, rotational flow in the flooded cyclone chamber 12 of the outer cyclone liner 14 passes through the inlet 22 of the inner cyclone liner 16, causing a rotational flow pattern therein. In other words, the outer cyclone liner 14, of larger diameter, acts as a flow distributor to the inlet 22 of the inner cyclone liner 16. Solid particles separated from the flow report to the discharge chamber 48, where they are removed by fluidising using a low fluid flow rate to create a vortex action. This fluidises the solids and causes them to report to the solids outlet duct 58 at a controllable velocity and concentration. Treated or separated fluids, typically hydrocarbon fluids, pass through the outlet duct 60.

The inner cyclone liner 16 should be displaced to the inoperative position when the cyclone separator 40 witnesses a high pressure drop across the system that indicates that the inner cyclone liner 16 taking the flow is too small or has insufficient area or volume for the unit to pass the incoming flow rate, whilst maintaining the required separation efficiency at the designed pressure drop. When in the inoperative position, the inner cyclone line 16 does not interfere with the flow through the larger outer cyclone liner 14. The effect is to decrease the pressure drop through the cyclone separator or de-sander to acceptable levels whilst maintaining desired flow rates and separation efficiencies.

It is an advantage of the invention that the inner cyclone liner 16 can be displaced during operation of the cyclone separator 40, ie, when it is online. Furthermore, the automatic operation of the displacement means enables most efficient operation of the separator.

The scope of the invention is intended to include any arrangement in which a plurality of cyclone assemblies or cyclone separators are incorporated in a treatment system in series or in parallel connection.

The invention claimed is:

1. A cyclone assembly comprising: a cyclone chamber formed by and within an outer cyclone liner, wherein the outer cyclone liner has an overflow outlet for fluids at an upper end and a discharge outlet for solids at a lower end; an inner cyclone liner adapted to be received within the cyclone chamber wherein the inner cyclone liner has an overflow outlet for fluids at an upper end and a discharge outlet for solids at a lower end, and wherein the inner cyclone liner is oriented in the same direction as the outer cyclone liner; and displacement means for displacing the inner cyclone liner relative to the cyclone chamber between an operative position and an inoperative position, wherein a housing is configured to receive the cyclone chamber and the inner cyclone liner in both the operative and the inoperative positions.

2. A cyclone assembly as claimed in claim 1 in which the inner cyclone liner is adapted to be displaced along a longitudinal axis of the outer cyclone liner between the operative position and inoperative position.

3. A cyclone assembly as claimed in claim 2 in which a seal is provided at a lower end of the inner cyclone liner, which seals between the inner and outer cyclone liners when the inner cyclone liner is in the operative position.

4. A cyclone assembly as claimed in claim 1 in which the inner cyclone liner has an inlet in its periphery.

5. A cyclone assembly as claimed in claim 1 in which the outer cyclone liner has an inlet in its periphery.

6. A cyclone assembly as claimed in claim 1 in which the inner cyclone liner is able to pass through the overflow outlet of the outer cyclone liner.

7. A cyclone assembly as claimed in claim 1 in which the housing has an inflow chamber, an overflow chamber and a discharge chamber.

8. A cyclone assembly as claimed in claim 7 in which the cyclone chamber is substantially contained in the inflow chamber.

9. A cyclone assembly as claimed in claim 7 in which the inner cyclone liner can be positioned concentrically within the cyclone chamber in the operative position, or displaced axially to the inoperative position within the overflow chamber.

10. A cyclone assembly as claimed in claim 1 in which actuation of the displacement means is automatic, and is triggered when a predetermined pressure differential is detected between an inflow and outflow of the separator.

11. A cyclone assembly as claimed in claim 1 in which the displacement means is a threaded spindle.

12. A cyclone assembly as claimed in claim 7 in which the displacement means is a threaded spindle and a hand wheel is provided for actuation of the threaded spindle by rotation.

13. A cyclone assembly as claimed in claim 1 in which the displacement means is powered by a device selected from the group consisting of a hydraulic or pneumatic actuator, an electric actuator, and springs.

14. A cyclone assembly as claimed in claim 7 in which a fluidising unit is connected to the discharge chamber.

15. A cyclone assembly as claimed in claim 1 in which a heating device is provided on the separator, the heating device selected from the group consisting of a heated jacket around the separator and heat tracing.

16. A cyclone assembly as claimed in claim 1 in which the cyclone separator is positioned on and adapted to be operated on a seabed and arranged to remove solids from a fluid flow prior to a process or separation system.

17. A method of increasing the flow capacity of a cyclone separator during use, comprising withdrawing an inner cyclone liner from an operative position within a cyclone chamber to an inoperative position axially spaced from the cyclone chamber, wherein the cyclone chamber is formed by an outer cyclone liner, and wherein the outer cyclone liner and the inner cyclone liner are disposed within a housing configured to contain the inner cyclone liner and the outer cyclone liner when the inner cyclone liner is in the inoperative position.

18. A method as claimed in claim 17 in which the pressure between an inlet and an outlet of the cyclone separator reduces as the flow capacity increases.

19. A method of reducing the flow capacity of a cyclone separator during use, comprising inserting an inner cyclone liner to an operative position within an outer cyclone liner from an inoperative position axially spaced from the outer cyclone liner, thereby making the inner cyclone liner, which has a smaller internal diameter than the outer cyclone liner, the operative liner of the cyclone separator, wherein the outer cyclone liner and the inner cyclone liner are disposed within a housing configured to contain the inner cyclone line and the outer cyclone liner when the inner cyclone liner is in the inoperative position.

20. A method as claimed in claim 19 in which the pressure between an inlet and an outlet of the cyclone separator increases as the flow capacity reduces.

* * * * *